May 26, 1931.  E. M. RAYBURN  1,807,013
VARIABLE SPEED POWER TRANSMISSION
Original Filed Nov. 26, 1923   3 Sheets-Sheet 1
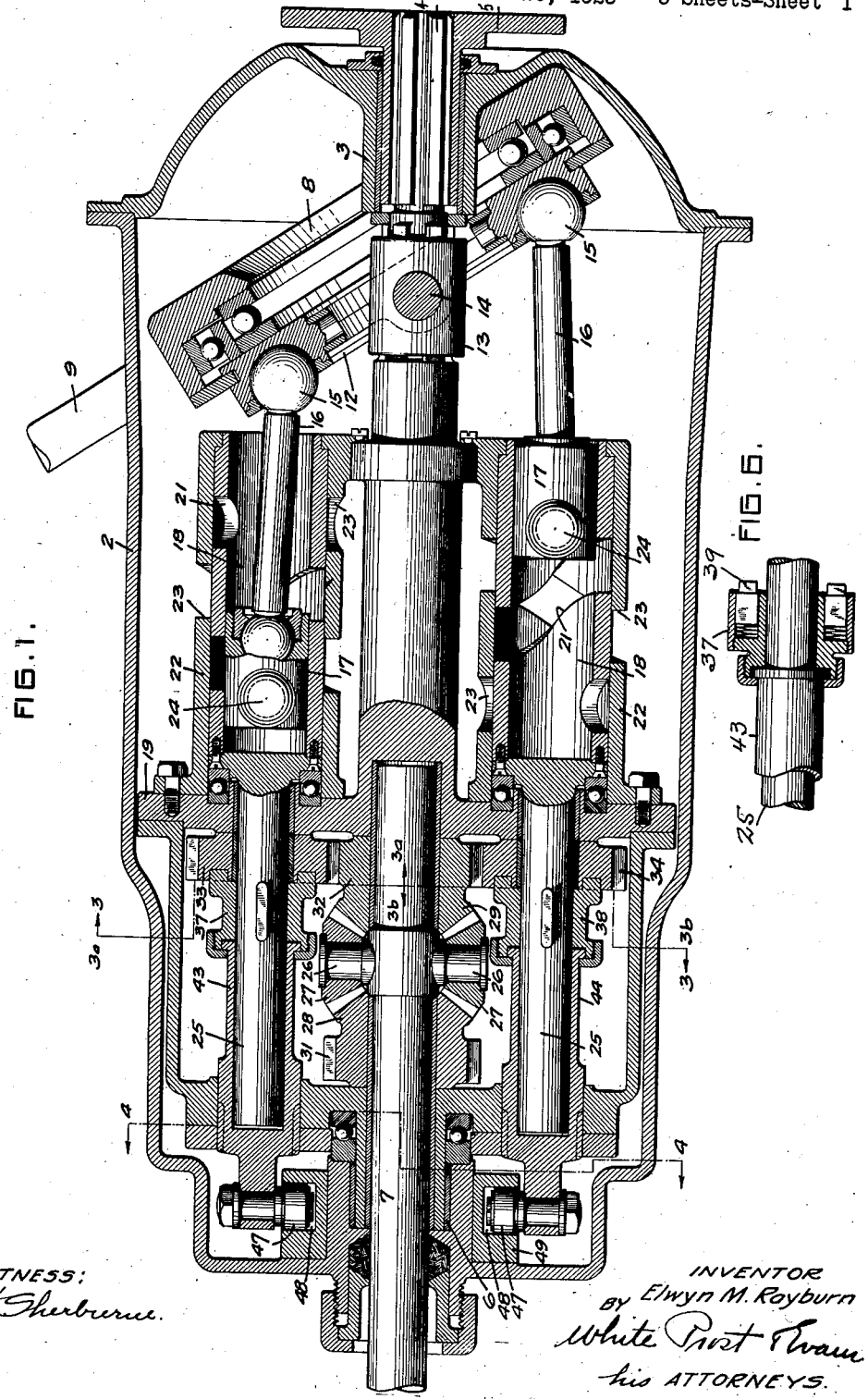
WITNESS:
H. Sherburne.
INVENTOR
Elwyn M. Rayburn
By White Prost Thomas
his ATTORNEYS.

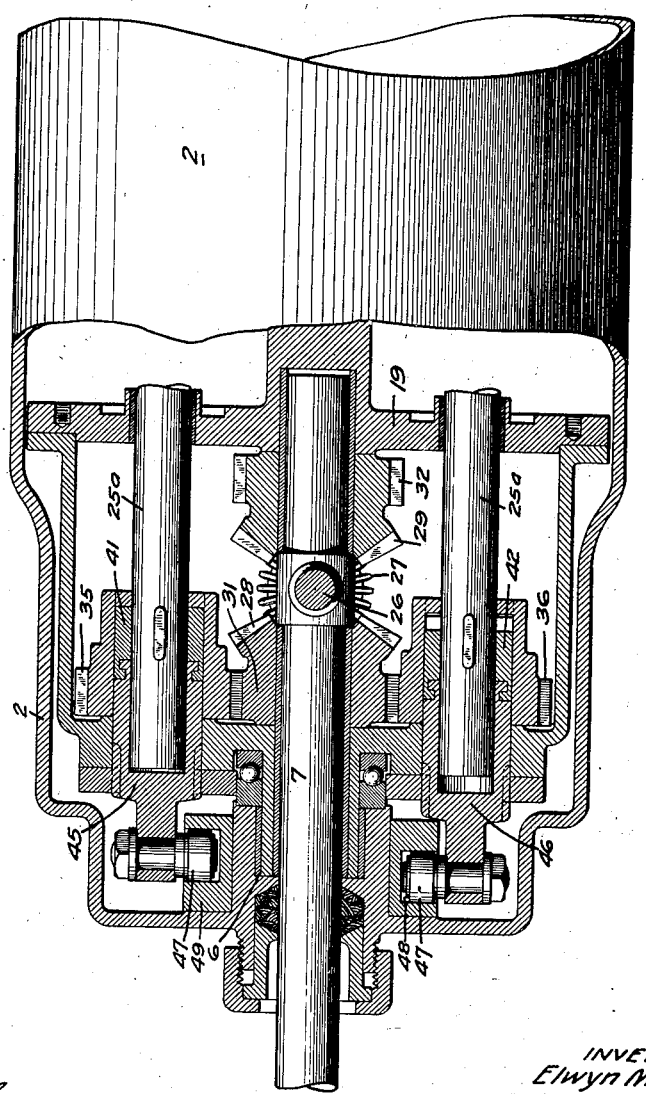

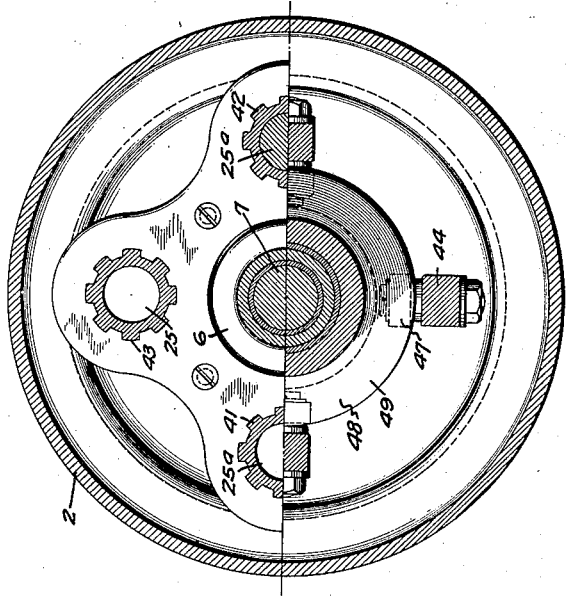

Patented May 26, 1931

1,807,013

UNITED STATES PATENT OFFICE

ELWYN M. RAYBURN, OF SAN FRANCISCO, CALIFORNIA

VARIABLE SPEED POWER TRANSMISSION

Refile for abandoned application Serial No. 676,989, filed November 26, 1923. This application filed January 29, 1931. Serial No. 512,185.

The invention relates to an apparatus for transmitting power, at variable speeds, from a driving element to a driven element.

An object of the invention is to provide a mechanical, variable speed power transmission, in which the speed ratio may be changed without interrupting the transmission of power.

Another object of the invention is to provide a variable speed power transmission in which the driven element is continuously, positively connected to the driving element.

Another object of the invention is to provide a variable speed power transmission in which power is transferred directly and mechanically from the driving shaft to the driven shaft and in which the speed ratio may be varied uniformly without interrupting the transmission of power from the driving shaft to the driven shaft.

A further object of the invention is to provide a variable speed power transmission in which variable speeds from direct drive forward through neutral into reverse may be obtained without disconnecting the driving and driven elements.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of power transmission apparatus embodying my invention, but it is to be understood that I do not limit myself to such form since the invention, as set forth in the claims, may be embodied in a plurality of forms.

Referring to said drawings:—

Figure 1 is a longitudinal section through a variable speed power transmission device embodying my invention.

Figure 2 is a longitudinal section of a portion of the device, taken in a plane at right angles to the plane of section of Figure 1.

Figure 3 is a section on the line 3—3, Figure 1, the upper section of the figure being a section on the line 3a—3a and the lower portion of the figure being a section on the line 3b—3b.

Figure 4 is a section taken on the line 4—4, Figure 1.

Figure 5 is a development of the cam groove which controls the transfer of power from the power driven oscillating gears.

Figure 6 is a longitudinal section through a clutch member.

The present invention relates to a device for transferring power from a driving shaft to a driven shaft at variable speeds, so that the driven shaft may be rotated at various speeds with respect to the speed of the driving shaft. Power is transferred from the driving shaft to the driven shaft by mechanical means and the continuity of these means is always preserved so that the speed ratio may be changed without interrupting the transfer of power. The device is particularly applicable for use in automobiles and other power propelled vehicles, wherein it is desirable to vary the torque of the driven shaft, depending upon the load to be propelled. The device of my invention comprises a driving shaft, means for converting the rotary movement of the driving shaft into a reciprocating movement of variable stroke depending upon the speed ratio, means for converting the reciprocating movement into a rotary oscillating movement and means for converting the oscillating movement into a uni-directional rotary movement of the driven shaft. This is accomplished while maintaining the driving shaft in direct mechancal engagement with the driven shaft so that the loss of power is reduced to a minimum.

The device of my invention comprises a stationary housing 2 which is mounted on the automobile frame or other suitable support. The housing is provided at one end with a bearing 3 for the drive shaft 4 which is provided on its end with a plate 5 adapted to be connected with the crank shaft of the engine of other source of power. At its other end the housing is provided with a bearing 6 for the driven shaft 7 and the end of the driven shaft is journalled in the end of the driving shaft thereby properly supporting both shafts at two points. Journalled on trunnions extending through the wall of the housing 2 is a circular race 8 which is movable about its trunnion by an external lever 9 so that the angle of the race with respect to the axis of the drive shaft may be varied. Journalled in the race, by suitable bearings, is a rotatable ring 12 which is connected with the sleeve 13 secured to the drive shaft 4 by a gimbal joint 14, so that the ring 12 rotates in synchronism with the drive shaft. Power is thus transferred from the driving shaft to the ring 12 regardless of the angle of the plane of the ring 12 with respect to the axis of the driving shaft. Connected to the ring 12 preferably by ball and socket joints 15 are a plurality of connecting rods 16, in the present instance there being four connecting rods each spaced 90 degrees from the adjacent connecting rod. With the race at an angle to the axis of the driving shaft and the driving shaft being rotated, the connecting rods are reciprocated, the stroke of the connecting rods depending upon the angle of the race. When the race is at right angles to the driving shaft there is no reciprocating movement of the connecting rod.

Connected to the other end of the connecting rods 16 are heads 17, the heads in the present instance being formed as pistons slidable in cylinders 18, there being four cylinders spaced apart 90 degrees and lying parallel with the axis of the driving shaft. The cylinders are journalled in a body 19 which is secured to and rotates with the driving shaft. Each cylinder is provided with a double helical groove 21, each helical groove extending preferable for one and a quarter circumferences of the cylinder. Surrounding each cylinder is a guide and bearing cylinder 22 having a helical groove 23 therein which is inclined in the opposite direction to the groove 21 and which extends for substantially the same distance circumferentially and longitudinally. The guide cylinder 22 is secured to the body so that it has no movement about its own axis. Each piston 17 is provided with two diametrically arranged projections or stubs 24 preferably in the form of rollers, which lie in the grooves 21 and 23. The cylinder 22 in which the grooves 23 are formed, being stationary, reciprocation of the piston 17 causes rotary oscillation of the cylinder 18 due to the travel of the rollers 24 in the groove 21. Since the helical grooves 21 and 23 are inclined in opposite directions and since the cylinder in which the groove 23 is formed is held stationary a stroke of the piston for its full length, causes the cylinder 18 to make two and a half revolutions. The number of revolutions made by the cylinder 18 for each stroke of the piston depends upon the length of the stroke and the length of the stroke is determined by the angularity of the race 8. When the race is at its maximum angularity with respect to the axis of the driving shaft 4, the cylinder 18 oscillates two and one-half revolutions for each stroke of the piston, that is rotates two and a half revolutions in one direction as the piston is moving in one direction and rotates two and a half revolutions in the opposite direction as the piston is moving in the opposite direction.

Secured to each cylinder 18 and journalled in the body 19 is a counter-shaft 25, there being four counter-shafts spaced apart 90 degrees from each other and lying parallel to the axis of the driving shaft 4. The counter-shafts 25, being secured to the cylinders 18, are given a rotary oscillatory movement in synchronism with the movement of the cylinders.

Means are provided for converting this rotary oscillatory movement into a uniform rotational movement in one direction. Each counter-shaft is provided with a gear which meshes with a gear of a differential mechanism, the differential pinion shafts of which are carried by the driven shaft 7 and by connecting and disconnecting the gear from the counter-shafts at the proper time during the rotation of the driving shaft, the oscillatory movement of the counter-shaft is converted to a uniform rotary movement in the driven shaft. The connections between the counter-shafts and the differential mechanism are slightly different for each pair of diametrically opposed shafts and in order to distinguish these shafts I shall refer to one pair of diametrically opposed shafts as counter-shafts 25 and the other pair as counter-shafts 25a. Counter-shafts 25 line a plane at right angles to the plane of counter shafts 25a.

The driven shaft 7 is provided with two diametrically opposed studs 26 upon which are journalled the differential pinions 27. Meshing with the differential pinions and journalled on the driven shaft 7 are the differential gears 28 and 29 each of which is formed with an integral spur gear 31 and 32. Rotatably mounted on the counter-shafts 25 are gears 33 and 34 which mesh with the gear 32 and rotatably mounted on the counter-shafts 25a are gears 35 and 36 which are in mesh with the spur gear 31. Means are provided for intermittently securing the gears 33, 34, 35 and 36 to their respective counter-shafts, so that they are rotated therewith and the engagement and disengagement of the gears to and from the counter-shafts is so timed that each gear is clutched with the gear 31 or 32 during that time only, in which the gear is rotating in one direction, or in other words, during one-half of its total cycle of oscillation. Splined to the counter-shafts 25 are toothed clutches 37 and 38 which are movable to lock the gears 33 and 34 to the counter-shaft and to release them therefrom. Splined to the counter-shafts 25a are clutches 41 and 42 which are similarly movable to cause engagement and disengagement of the gears 35 and 36 with their respective counter-shafts. The clutches 37 and 38 and 41 and 42 are moved longitudinally of the counter-shafts into and out of clutching engagement with gears, by means of the longitudinally movable sleeves 43, 44, 45 and 46. The clutches 37, 38, 41 and 42 are preferably provided with spring pressed teeth 39 which engage the teeth or sockets on the side faces of the cooperating gears. The number of teeth on the clutch is preferably greater or less, by one tooth, than the teeth or sockets on the gears so that the clutches will always engage without rasping. The sleeves are guided in the body 19 and are splined therein so that they may not rotate and are moved longitudinally in time with the rotation of the body to establish and break connection between the counter-shafts and the respective gears. Each sleeve is provided on its end with a roller 47 and the four rollers are seated in a cam groove 48 formed in the boss 49 which is integral with the housing 2. The groove 48 is provided with a cam portion which causes rapid longitudinal movement of the clutch as the respective roller passes over the cam portion. When the rollers are in one part of the groove the clutches are in, and when the rollers are in the other part of the groove the clutches are out, so that it is permissible to describe the groove as having an "in" portion 51 and an "out" portion 52. The length of the "in" portion of the groove is preferably 180 degrees so that each clutch is held in engagement during 180 degrees movement of the driving shaft. The "out" portion of the groove is slightly less than 180 degrees in length. There must therefore be two clutches in engagement at all times and at certain instants there are three clutches in engagement, one just entering engagement and one just leaving engagement. The groove is so arranged that the gears 33, 34, 35 and 36 are clutched to their respective counter-shafts during such time as their rotation will be effective to cause uniform uni-directional rotation of the driven shaft 7. Each of the gears 33, 34, 35 and 36 is held in engagement with its respective counter-shaft during the time that the piston 17 is making one complete stroke in one direction. Since the movement of the piston is reciprocatory, being an accelerating movement during the first half of its stroke and a retarding movement during the last half of its stroke, the counter-shaft 25 has an accelerating movement during the first half of its oscillation in one direction and a retarding movement during the last half of its rotation in one direction. The accelerating and retarding movements are equal and at the end of a stroke the counter-shafts are brought to rest, thus permitting the clutches to engage and disengage readily.

Only one gear is clutched with one of the differential gears 28 or 29, at the same time and due to the interposition of the differential pinion, it is immaterial that the gears 31 and 32 may rotate at slightly different angular velocity. In fact the gear 31 will be moving at its maximum velocity at the time that the gear 32 is substantially stationary and as the gear 32 moves toward its maximum velocity, the gear 31 retards towards its minimum velocity, so that the combined velocities of the two gears 31 and 32 is always equal. Motion is transmitted from the gears 31 and 32 through the differential pinions 27 to the driven shaft 7 which is thereby rotated at a uniform velocity.

The speed ratio between the driving shaft and driven shaft is varied by varying the angle of inclination of the race 8. When the race 8 is perpendicular to the axis of the driving shaft 4, there is no reciprocation of the pistons 17 and consequently no rotation of the counter-shafts 25 and 25a about their axes, with the result that the gears 33, 34, 35 and 36 are held against axial rotation. The counter-shafts are rotated in a circle by the rotating body 19 and since the gears are locked, the gears 28 and 32 rotate with the body and in the same direction, thus causing the driven shaft 7 to rotate at the same speed as the driving shaft. As the angle of inclination of the race is varied from perpendicularity with respect to the driving shaft, the counter-shafts are oscillated through varying angles and their motion is transmitted to the gears 31 and 32 varying the speed of their gears to cause the driven shaft to rotate at a lesser speed than the driving shaft. When the race 8 reaches an inclination which causes such reciprocation of the piston 17, that the counter-shafts oscillate through an arc of 360 degrees forward and back for each revolution of the body, the gears 28 and 29 remain stationary. This is the neutral position of the race, since at this position, the driven shaft is not rotated. As the race is inclined further, toward the position shown in Figure 1, the gears 31 and 32 are driven slowly in a direction opposite to that of the drive shaft by virtue of gears 33, 34, 35 and 36, being driven at a speed in excess of that described for the vertical condition, so that they serve to drive the shaft 7 in the reverse direction. With the race 8 in the direct drive position, the gears 28 and 29 are locked, as the race is moved from this position the gears start rotating until their speed is equal to the speed of the body, at which time the driven shaft remains stationary. When the speed of the gears is greater than the speed of the body the direction of rotation of the driven shaft is reversed.

I have thus provided a mechanical, variable speed transmission mechanism in which the driven shaft is continually in direct engagement with the driving shaft and in which the relative speeds of the two shafts may be varied uniformly or by small increment, without interrupting the transmission of power from the driving shaft to the driven shaft.

The transmission of my invention contemplates the inter-position of a planetary gear between the driving shaft and the driven shaft and means for controlling or varying the speed of rotation of the planet gears, whereby the speed of the sun gear is varied. In the embodiment shown in the drawings I have employed two planetary gears and have connected the sun gears to the driven shaft through a differential so that the intermittent rotation of the planet gears of the two planetary systems produces unidirectional rotation of the driven shaft. The gears 31 and 32 are the sun gears, the gears 33 and 34 are the planet gears of one system and the gears 35 and 36 are the planet gears of the other system. Orbital movement of the planet gears is effected by rotation of the body 19 and rotation of the planet gears on their axes is effected by engagement between the planet gears and the counter-shafts on which they are mounted. The counter-shafts and the clutches for connecting the counter-shafts to the planet gears thus serve as the ring gear in the usual form of planetary system. The planet gears are carried by the driving member, so that with a constant speed of the driving member, their orbital speed is constant. The speed of the sun gear is therefore determined by the relative orbital speed and axial speed of the planet gears and by varying the axial speed, the speed of the sun gear with respect to the speed of the driving member is varied. With a zero axial speed, the sun gear rotates at the same velocity as the driving member. With an axial speed equal to orbital speed, the sun gear remains stationary and with an axial speed in excess of orbital speed, the sun gear rotates in the opposite direction. These results are accomplished by the use of the two planetary systems and the differential gear. In each planetary system, the axial speeds of the planet gears may be varied to vary the speed of the sun gears.

I claim.

1. In a variable speed power transmission, a driving shaft, a plurality of elements adapted to be reciprocated by rotation of said shaft, a counter-shaft associated with each reciprocating element and adapted to be oscillated by the reciprocating movement thereof, a driven shaft, a differential gear associated with the driven shaft, gears on the counter shafts engaging said differential gears and means for securing the gears to the counter-shafts during rotation thereof in one direction.

2. In a variable speed power transmission, a driving shaft, a plurality of elements adapted to be reciprocated by said shaft, means for varying the stroke of the reciprocating elements, a counter-shaft associated with each element, means interposed between each counter-shaft and its associated element whereby reciprocation of the element causes rotary oscillation of the counter-shaft, said means being arranged so that the oscillations of the various counter-shafts are differently timed, a driven shaft, a differential gear secured to the driven shaft, gears loosely mounted on the counter-shafts and meshing with said differential gear and means for separately securing said gears to the respective counter-shafts.

3. In a variable speed power transmission, a driving shaft, a plurality of elements adapted to be reciprocated by said shaft, means for varying the stroke of the reciprocating elements, a counter-shaft associated with each element, means interposed between each counter-shaft and its associated element, whereby reciprocation of the element causes rotary oscillation of the counter-shaft, said means being arranged so that the oscillations of the various counter-shafts are differently timed, a driven shaft, a differential gear secured to the driven shaft, gears loosely mounted on the counter-shafts and meshing with said differential gear and means operative in time with the rotation of the driving shaft for separately securing said gears to and releasing them from the respective counter-shafts.

4. In a variable speed power transmission, a driving shaft, a body rotated by said shaft, a plurality of helically grooved cylinders journalled in said body, pistons in said cylinders engaging in said grooves, rotation of said body causing reciprocation of said pistons, means for varying the stroke of said pistons, whereby reciprocation of said pistons causes rotary oscillation of said cylinders, a counter-shaft journalled in the body and secured to each cylinder, a gear loosely mounted on each counter-shaft, a driven shaft, a differential gear associated with said driven shaft and with which the said gears are in mesh and means operative in time with the rotation of the body for separately securing said gears to and releasing them from the respective counter-shafts.

5. In a variable speed power transmission, a driving shaft, a driving body secured to said shaft, a driven shaft journalled in said body, a plurality of counter-shafts journaled in said body, means for oscillating said counter-shafts, means for varying the speed of said counter-shafts, gears loosely mounted on the counter-shafts, means connecting said gears with the driven shaft and means for securing said gears to the counter-shafts during rotation of the counter-shafts in one direction.

6. In a variable speed power transmission, a driving shaft, a driving body secured to said shaft, a driven shaft, stub shafts extending perpendicularly from the driven shaft, bevel gears on said stub shafts, bevel gears loosely mounted on the driven shaft and meshing with said first named bevel gears, spur gears integral with the latter bevel gears, counter-shafts carried by said body, spur gears loosely mounted on said counter-shafts and meshing with said first mentioned spur gears, means for oscillating said counter-shafts at adjustable angular velocities and means for securing certain of the latter spur gears to the respective counter-shafts during oscillation of the counter-shafts in one direction.

In testimony whereof I affix my signature.

ELWYN M. RAYBURN.